United States Patent [19]

Matsubara et al.

[11] Patent Number: 4,902,459
[45] Date of Patent: Feb. 20, 1990

[54] METHOD OF MAKING CERAMIC ARTICLES

[75] Inventors: Saburo Matsubara, Yokohama; Shinichi Yagi, Kawasaki, both of Japan

[73] Assignee: Nippon Oil Co. Ltd., Tokyo, Japan

[21] Appl. No.: 6,288

[22] Filed: Jan. 20, 1987

Related U.S. Application Data

[63] Continuation of Ser. No. 706,018, Feb. 27, 1985, abandoned.

[30] Foreign Application Priority Data

Feb. 29, 1984 [JP] Japan ............................ 59-36166

[51] Int. Cl.$^4$ ............................................. C04B 35/64
[52] U.S. Cl. ........................................ 264/63; 264/56
[58] Field of Search ......................................... 264/63, 56

[56] References Cited

U.S. PATENT DOCUMENTS

| | | | |
|---|---|---|---|
| 2,434,271 | 1/1948 | Howatt | 264/63 |
| 4,233,256 | 11/1980 | Ohnsorg | 264/63 |
| 4,265,794 | 5/1981 | Pett et al. | 264/63 |

FOREIGN PATENT DOCUMENTS 966945 8/1964 United Kingdom .................. 264/63

OTHER PUBLICATIONS

Resin Review, vol. XI, No. 1, 1961, "Acrylic Polymers and Wetting Agents in Ceramics".

*Primary Examiner*—James Derrington
*Attorney, Agent, or Firm*—Schmeiser, Morelle & Watts

[57] ABSTRACT

Disclosed is a method of making ceramic articles which comprises the steps of shaping ceramic powder with the aid of an organic binder and firing the resulting shaped body, characterized in that a mixture of (A) 90 to 10% by weight of an isobutylene polymer and (B) 10 to 90% by weight of an acrylic polymer is used as the organic binder in an amount of 0.2 to 20 parts by weight per 100 parts by weight of the ceramic powder. The use of the aforesaid organic binder makes it possible to produce shaped bodies having high green strength and, moreover, dense fired products.

4 Claims, No Drawings

METHOD OF MAKING CERAMIC ARTICLES

This application is a continuation of application Ser. No. 706,018, filed Feb. 27, 1985, now abandoned.

BACKGROUND OF THE INVENTION

1. Field of the Invention

This invention relates to a method of making ceramic articles. More particularly, it relates to a method of making ceramic articles by use of an organic binder which can provide good granulation properties in forming ceramic powder into granules and, when such granules are shaped, can produce shaped bodies having high green (or unfired) strength and, moreover, dense fired products.

2. Description of the Prior Art

Ceramic articles made by firing powder materials such as alumina, ferrite, tungsten carbide, silicon nitride and silicon carbide have come to be used in a wide range of applications including electrical insulating materials, magnetic materials, electronic components, mechanical parts, automobile parts and cutting tools.

Conventionally, such ceramic articles are generally made as follows: First, a slurry is prepared by mixing a ceramic powder material with a solvent or water and an organic binder. Then, using a spray dryer, the slurry is formed into granules. Alternatively, an organic binder dissolved in a solvent or water is added to a ceramic powder material and they are blended by means of an automatic mortar or the like. The resulting agglomerates are crushed and adjusted to a desired size. The granules thus obtained are shaped by means of, for example, a compression molding machine, rubber pressing machine or hot pressing machine. Alternatively, the granules can also be shaped by extrusion molding or slurry casting. Then, the resulting shaped bodies are fired to produce a variety of ceramic articles.

If the unfired, shaped bodies have low green strength, they are often cracked or chipped during the succeeding binder removal and firing steps. Accordingly, the unfired, shaped bodies must have sufficiently high green strength in order to achieve a reduction in rejection rate and hence an improvement in productivity. On the other hand, in order to prevent the die from being damaged and in order to produce dense shaped bodies containing few pores, it is necessary that the granules used as the starting material be easily collapsed and shaped under moderate pressure during the shaping step. To this end, it is desirable to use an organic binder having wellbalanced performance characteristics. An additional property required for organic binders is good thermal decomposability. An organic binder having poor thermal decomposability requires high temperatures and long periods of time in the binder removal step. In some cases, residual carbon may remain in the final ceramic product, resulting in a significant reduction in electrical properties, magnetic properties and physical or mechanical properties.

Typical organic binders which have been used in the prior art include, for example, polyvinyl alcohol, alkali metal salts of carboxymethyl cellulose and alkali metal salts of acrylic resins. However, these binders have been disadvantageous in many respects. Specifically, polyvinyl alcohol has been commonly used because of its low price, but it may gather mold during storage and may give off harmful gases and a bad odor to create an undesirable working environment. Moreover, the granules formed with polyvinyl alcohol are so hard that considerable damage is caused to the shaping die. In addition, the granules are difficult to collapse and, therefore, produce shaped bodies which contain many pores and tend to become cracked and/or chipped. Furthermore, polyvinyl alcohol exhibits poor thermal decomposability during the firing step, so that the presence of much residual carbon prevents the production of dense ceramic articles. On the other hand, alkali metal salts of carboxymethyl cellulose give high viscosity even when used in low concentrations, and are difficult to handle because of their thixotropic properties. Moreover, like alkali metal salts of acrylic resins, they exhibit poor thermal decomposability. Thus, they also fail to produce dense ceramic articles, similar to polyvinyl alcohol.

SUMMARY OF THE INVENTION

It is an object of the present invention to provide a method of making ceramic articles by use of an organic binder which can overcome the abovedescribed disadvantages of conventional organic binders and which can produce shaped bodies having high green strength and, moreover, dense fired products.

It is another object of the present invention to provide a novel organic binder for the granulation of ceramic powder which can provide good granulation properties in forming ceramic powder into free-flowing granules.

According to the present invention, there is provided a method of making ceramic articles which comprises the steps of shaping ceramic powder with the aid of an organic binder and firing the resulting shaped body, characterized in that a mixture of (a) 90 to 10% by weight of an isobutylene polymer and (b) 10 to 90% of an acrylic polymer is used as the organic binder in an amount of 0.2 to 20 parts by weight per 100 parts by weight of the ceramic powder.

DETAILED DESCRIPTION OF THE INVENTION

The isobutylene polymer used in the present invention is a polymer obtained by polymerizing isobutylene or a mixture of isobutylene and n-butene as the principal component(s). Such isobutylene polymers can readily be prepared by reacting the aforesaid monomer(s) at a temperature of $-50°$ C. to $40°$ C. in the presence of an acid catalyst (in particular, a Friedel-Crafts catalyst) such as aluminum chloride, silica alumina or a cation exchange resin. In polymerizing the aforesaid monomer(s) for industrial purposes, a mixture of the monomer(s) and butane may be used as the starting material instead of pure isobutylene and/or n-butene. After completion of the polymerization, unreacted monomer(s) may be separated by distillation or other techniques to obtain a polymer having the desired molecular weight. In this manner there can be prepared polymers having a number average molecular weight of the order of 300 to 3,000 or a Flory viscosity average molecular weight of the order of 7,000 to 100,000 as determined by the Flory viscometric method. Among others, polymers having a number average molecular weight of 300 to 3,000 are commonly known as polybutenes. (A number average molecular weight of 3,000 is equivalent to a Flory viscosity average molecular weight of about 7,000). The molecular weight of the isobutylene polymer used in the present invention can range widely from a number average molecular weight of 300 to a Flory viscosity average molecular weight of 100,000. If the molecular weight of the isobutylene polymer is higher than this range, the polymer will be difficult to emulsify and fail to give a stable emulsion. On the other hand, if the molecular weight is lower than this range, the granulation properties of the ceramic powder will be degraded. Moreover, because of its reduced flash point, the polymer will involve the risk of fire during the drying step.

In particular, where the ceramic powder comprises ferrite which is difficult to granulate, it is desirable to use an isobutylene polymer having a number average molecular weight of 500 to 3,000 and preferably 700 to 2,800 for the purpose of maintaining a balance between granulation properties and green strength. Where the ceramic powder comprises, for example, silicon nitride, alumina or tungsten carbide, it is possible to use an isobutylene polymer whose molecular weight ranges from a number average molecular weight of 300 to a Flory viscosity average molecular weight of 100,000 and preferably from a number average molecular weight of 500 to a Flory viscosity average molecular weight of 90,000.

The isobutylene polymer may not only be used as is, but also in the form of a solution or dispersion in water or other solvent. However, it is most preferable to use it in the form of an aqueous emulsion. An emulsion of an isobutylene polymer can be prepared by adding a surfactant, such as a nonionic surfactant, an anionic surfactant or a mixture thereof, to the isobutylene polymer and then adding thereto enough water to give any desired solid content. Alternatively, it is also possible to blend an isobutylene polymer and an acrylic polymer in advance and then form the blend into an emulsion.

The acrylic polymer which is used as the other constituent in the organic binder of the present invention is a polymer that is obtained by polymerizing one or more acrylic monomers as the principal components (more than 30% by weight) and has a glass transition temperature of $-70°$ C. to 190° C. and preferably $-60°$ C. to 150° C. Examples of the aforesaid acrylic polymer include polymers derived from a monomer selected from acrylic acid, acrylic acid esters, methacrylic acid and methacrylic acid esters; copolymers derived from two or more such monomers; and copolymers derived from one or more such monomers and one or more other vinyl monomers. The acrylic polymer may not only be used as is, but also in the form of a solution or dispersion in water or other solvent. However, it is most preferable to use it in the form of an aqueous emulsion. An aqueous emulsion of an acrylic polymer can be prepared either by adding a monomer as described above or a mixture of such monomers dropwise to water containing a surfactant and a polymerization initiator and then polymerizing the monomer(s), or by adding a surfactant and a monomer as described above or a mixture of such monomers dropwise to water containing a polymerization initiator and then subjecting the monomer(s) to emulsion polymerization. More specifically, useful acrylic acid esters include, for example, methyl acrylate, ethyl acrylate, butyl acrylate, isobutyl acrylate, cyclohexyl acrylate and 2-ethylhexyl acrylate. Useful methacrylic acid esters include, for example, methyl methacrylate, ethyl methacrylate, butyl methacrylate, isobutyl methacrylate, cyclohexyl methacrylate, 2-ethylhexyl methacrylate and t-butyl methacrylate. Useful vinyl monomers include, for example, vinyl acetate, styrene and its derivatives and acrylonitrile. In addition, it is also possible to use a crosslinked acrylic polymer emulsion derived from a combination of hydroxyethyl acrylate, 2-hydroxyethyl methacrylate or hydroxypropyl methacrylate and polyisocyanates, alkylmelamines or polyethyleneimine. In particular, where the ceramic powder comprises ferrite, an organic binder is required which can provide sufficient green strength when used in a relatively small amount. Thus, it is desirable that the glass transition temperature of the acrylic polymer ranges from $-30°$ C. to 190° C. and preferably from $-20°$ C. to 150° C. If the glass transition temperature is lower, the shaped body will have undesirably low green strength and, hence, may be cracked or chipped during the binder removal step and/or the firing step.

The aforesaid isobutylene polymer (A) and the aforesaid acrylic polymer (B) are used in a mixing ratio such that 90 to 10 parts by weight of (A) is mixed with 10 to 90 parts by weight of (B) and, preferably, 85 to 15 parts by weight of (A) is mixed with 15 to 85 parts by weight of (B). Where these polymers are used in the form of emulsions, the mixing ratio designates a weight ratio expressed in terms of solid content. If the amount of isobutylene polymer used is greater than this range, the ceramic powder will exhibit poor granulation properties and the shaped body will have low green strength. On the other hand, if the amount of isobutylene polymer used is less than this range, the ceramic powder will also exhibit poor granulation properties. Moreover, it will exhibit poor thermal decomposability, so that the final fired product will contain residual carbon which tends to exert an adverse influence on its electrical and magnetic properties.

The ceramic powder used in the present invention can be any inorganic material that is in the form of a sinterable powder. Examples thereof include oxides such as alumina, silica, magnesia, zirconia, beryllia, thoria, urania, titania and ferrite; carbides such as silicon carbide, titanium carbide, tungsten carbide, boron carbide and zirconium carbide; titanates such as barium titanate, magnesium titanate, calcium titanate and strontium titanate; and other inorganic material. These materials may be used alone or in admixture of two or more. Among others, it is preferable to use a material selected from ferrite, alumina, tungsten carbide, silicon nitride, barium titanate, magnesium titanate and titanium carbide. In addition, one or more powdered metals such as iron, copper, aluminum, silicon, nickel, cobalt, alloys of these metals and stainless steel may be added to the aforesaid ceramic powder, if desired.

In the method of the present invention, the steps of shaping the ceramic powder and firing the shaped body to form a ceramic article can be carried out according to any conventional procedure. For example, the aforesaid organic binder may be added to the ceramic powder material, followed by blending for 5 to 15 minutes. The resulting agglomerates may be crushed and adjusted to desired size granules may then be dried at a temperature of 80° C. to 100° C. Alternatively, a slurry may be prepared by adding the aforesaid organic binder and water to the ceramic powder material. Then, using a spray dryer or the like, this slurry may be formed into granules of 10 to 150 $\mu$m diameter. Typically, the granular thus obtained may then be shaped by dry pressing, rubber pressing or hot pressing and then fired to make ceramic articles. Any other conventional procedures can also be used for this purpose. For example, the slurry may be shaped by extrusion molding, slurry casting or doctor blade method, and then fired by heating the shaped body to the sintering temperature in an oxidizing atmosphere, an inert gas atmosphere or a reducing atmosphere.

In the method of making ceramic articles in accordance of the present invention, conventional additives such as plasticizers, lubricants, deflocculants, dispersants and parting agents may suitably be used in addition to the ceramic powder material and the organic binder. Furthermore, minor amounts of conventional organic binders may be used in combination with the organic binder of the present invention.

Typical examples of the ceramic articles made by the method of the present invention include earthenware, refractories, grindstones, graphite electrodes, ignition plugs, honeycomb carriers, optical communication fibers, ceramic condensers, thermistors, magnetic head ferrites, magnetic core materials, gas sensors, temperature sensors, varistors, piezooscillators, integrated-circuit bases and packages, electrical insulating materials and nuclear reactor materials.

According to the method of the present invention in which ceramic powder is shaped by the combined use of two types of organic binders and the resulting shaped body is fired to obtain a final product, the synergistic effect of those organic binders can provide excellent performance which has not been achieved by using each of them alone.

Specifically, during the granulation process, the ceramic powder can be effectively formed into freeflowing granules. Moreover, these granules have such a degree of hardness that they can be easily collapsed under moderate pressure during the shaping step. In addition, their hardness is not influenced by their water content, contrast to the granules formed with polyvinyl alcohol. Accordingly, shaped bodies containing few pores and having high green strength can be obtained consistently.

Furthermore, additional advantages can also be obtained. For example, since the unfired, shaped bodies have high green strength, they are seldom cracked or chipped prior to the firing step, thus resulting in an improvement in productivity. Moreover, the good thermal decomposability of the organic binder of the present invention permits dense ceramic articles to be made.

The present invention is further illustrated by the following examples.

EXAMPLE 1

To 100 parts by weight of polyisobutylene having a number average molecular weight of 750 were added 10 parts by weight of polyoxyethylene nonylphenol ether (HLB=12.2) and 90 parts by weight of water. This mixture was stirred to form an isobutylene polymer emulsion.

Separately, an acrylic polymer emulsion was prepared by charging 10 parts by weight of polyethylene oxide stearyl ether (with 50 moles of ethylene oxide) as a surfactant and 100 parts by weight of water into a four neck flask fitted with a stirrer. This flask was purged with nitrogen and heated to 50° C. After the addition of 1 part by weight of potassium persulfate as a polymerization initiator, a mixture of 30 parts by weight of butyl acrylate, 10 parts by weight of methyl methacrylate and 60 parts by weight of styrene was continuously added over a period of approximately 3 hours. Then, polymerization was effected at 60° C. for an additional 4 hours. The resulting polymer had a glass transition temperature of 35° C.

The ceramic powder used was prepared as follows: A mixture of 51 mole % of $Fe_2O_3$, 24 mole % of MnO and 25 mole % of ZnO was blended in a ball mill for 10 hours, dried, calcined at 850° C. for 3 hours, and then ground in a ball mill for 15 hours.

To 100 parts by weight of this ceramic powder were added the aforesaid isobutylene polymer emulsion and acrylic polymer emulsion in the predetermined amounts (shown in Table 1). The resulting mixture was formed into granules according to conventional granulation procedure. The rate of granulation was 95.0% by weight. The term "rate of granulation" as used herein means the weight percentage of granules of 20 to 120 mesh size among all granules. A sample of these granules was placed in a die and pressed under a pressure of 1.0 ton/cm² to obtain a shaped body having good green strength characterized by a green density of 3.13 g/cc and a compression fracture strength of 36.5 kg/cm². When observed under a microscope, its surface was found to be dense and in a good condition. Then, this shaped body was placed in a furnace and fired at about 1,450° C. for 4 hours in an atmosphere of nitrogen gas containing 0.1% of oxygen. As a result, no occurrence of cracking or chipping was observed during the firing step and there was obtained a dense final product having a fired density of 4.80 g/cc.

EXAMPLE 2

The procedure of Example 1 was repeated except that a polymer emulsion (Tg=6° C.) obtained by emulsion polymerization of 58 parts by weight of butyl acrylate and 52 parts by weight of methyl methacrylate was used as the acrylic polymer emulsion. The resulting granules were shaped and fired to obtain a final product. The details of formulation and the results of evaluation are shown in Table 1.

EXAMPLE 3

The procedure of Example 1 was repeated except that an emulsion of polyisobutylene having a number average molecular weight of 2,500 was used as the isobutylene polymer emulsion and a polymer emulsion (Tg=−22° C.) obtained by emulsion polymerization of 60 parts by weight of 2-ethylhexyl acrylate and 40 parts by weight of methyl methacrylate was used as the acrylic polymer emulsion. The resulting granules were shaped and fired to obtain a final product. The details of formulation and the results of evaluation are shown in Table 1.

EXAMPLE 4

The procedure of Example 1 was repeated except that an emulsion of polyisobutylene having a number average molecular weight of 1,300 was used as the isobutylene polymer emulsion and the mixing ratio of isobutylene polymer to acrylic polymer was 65/35. The resulting granules were shaped and fired to obtain a final product. The details of formulation and the results of evaluation are shown in Table 1.

COMPARATIVE EXAMPLE 1

The procedure of Example 1 was repeated except that an emulsion of polyisobutylene having a number average molecular weight of 750 was used alone as the organic binder. The resulting granules were shaped and fired to obtain a final product. The details of formulation and the results of evaluation are shown in Table 1.

COMPARATIVE EXAMPLE 2

The procedure of Example 1 was repeated except that an acrylic polymer emulsion (Tg=−44.7° C.) obtained by emulsion polymerization of 95 parts by weight of butyl acrylate and 5 parts by weight of methyl methacrylate was used alone as the organic binder. The resulting granules were shaped and fired to obtain a final product. The details of formulation and the results of evaluation are shown in Table 1.

COMPARATIVE EXAMPLE 3

The procedure of Example 1 was repeated except that an acrylic polymer emulsion (Tg=62° C.) comprising the emulsion polymerization product of 35 parts by weight of methyl acrylate and 65 parts by weight of methyl methacrylate was used alone as the organic binder. The resulting granules were shaped and fired to obtain a final product. The details of formulation and the results of evaluation are shown in Table 1.

COMPARATIVE EXAMPLE 4

The procedure of Example 1 was repeated except that a 10% aqueous solution of polyvinyl alcohol (with a degree of saponification of 87–89 mole % and commercially available from Denki Kagaku Kogyo K.K. under the trade name of Denkapoval B-05) was used as the organic binder. The resulting granules were shaped and fired to obtain a final product. The details of formulation and the results of evaluation are shown in Table 1.

It is evident from these comparative examples that the organic binder of the present invention can provide good granulation properties and can also produce dense shaped bodies having high green strength and a good surface condition and, moreover, dense final products. In contrast, all of the organic binders of Comparative Examples 2–4 were found to be poor in thermal decomposability. When their thermal decomposition properties were tested by heating a sample in air to an elevated temperature of 500° C. at a rate of 10° C./min, the presence of residual carbon was observed.

of 80 parts by weight of butyl acrylate and 20 parts by weight of methyl methacrylate. The resulting organic binder was added to alumina powder having an average particle diameter of 1 μm to form a slurry, which was granulated by means of a spray dryer. According to the same procedure as described in Example 1, the granules thus obtained were shaped and fired to obtain a final product. When the shaped body and the final product were observed under a microscope, their surfaces were found to be dense and in a good condition. The details of formulation and the results of evaluation are shown in Table 2.

COMPARATIVE EXAMPLE 5

The procedure of Example 5 was repeated except that the same aqueous solution of polyvinyl alcohol as used in Comparative Example 4 was used as the organic binder. The resulting granules were shaped and fired to obtain a final product. The details of formulation and the results of evaluation are shown in Table 2.

EXAMPLE 6

In the same manner as described in Example 5, an emulsion was prepared from polyisobutylene having a Flory viscosity average molecular weight of 60,000. This isobutylene polymer emulsion was mixed with the same acrylic polymer emulsion as used in Example 5, in the ratio of 70/30. The resulting organic binder was added to commercially available tungsten carbide powder having an average particle diameter of 1 μm, and the resulting slurry was granulated. According to the same procedure as described in Example 1, the granules thus obtained were shaped and fired to obtain a final product. The details of formulation and the results of evaluation are shown in Table 2.

COMPARATIVE EXAMPLE 6

The procedure of Example 6 was repeated except that the same aqueous solution of polyvinyl alcohol as used in Comparative Example 4 was used as the organic binder. The resulting granules were shaped and fired to

TABLE 1

| | | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Polyisobutylene (molecular weight) | | 750 | 750 | 2,500 | 1,300 | 750 | — | — | PVA |
| Mixing ratio* (by weight), (A)/(B) | | 50/50 | 40/60 | 30/70 | 63/35 | 100/0 | 0/100 | 0/100 | |
| Amount of binder added (parts by weight) | | 2 | 2 | 2 | 2 | 2 | 2 | 2 | 2 |
| Results of evaluation | Rate of granulation (% by weight) | 95 | 94 | 90 | 92 | 45 | 73 | 70 | 93 |
| | Green density (g/cc) | 3.13 | 3.12 | 3.12 | 3.13 | 3.08 | 3.07 | 3.04 | 3.02 |
| | Compression fracture strength (kg/cm$^2$) | 37.5 | 35.5 | 30.0 | 34.0 | 15.0 | 18.0 | 35.0 | 29 |
| | Surface condition** | ◎ | ◎ | ◎ | ◎ | ◎ | ◎ | X | X |
| | (Overall evaluation) | (O) | (O) | (O) | (O) | (X) | (X) | (X) | (X) |
| | Fired density (g/cc) | 4.80 | 4.80 | 4.79 | 4.80 | 4.73 | 4.72 | 4.70 | 4.69 |

*Ratio of (A) isobutylene polymer to (B) acrylic polymer (in terms of solid content).
**O= dense (no pores were observed);
X = porous (many pores were observed).

EXAMPLE 5

An emulsion was prepared by adding 10 parts by weight of polyoxyethylene nonylphenol ether (HLB=4.5) and water to 100 parts by weight of polyisobutylene having a Flory viscosity average molecular weight of 40,000. This isobutylene polymer emulsion was mixed with an acrylic polymer emulsion (Tg=−35.5° C.) obtained by emulsion polymerization obtain a final product. The details of formulation and the results of evaluation are shown in Table 2.

EXAMPLE 7

The same organic binder as used in Example 1 was added to commercially available silicon nitride powder having an average particle diameter of 1 μm, and the resulting slurry was granulated. According to the same procedure as described in Example 1, the granules thus obtained were shaped and fired to obtain a final product. The details of formulation and the results of evaluation are shown in Table 2.

COMPARATIVE EXAMPLE 7

The procedure of Example 7 was repeated except that the same aqueous solution of polyvinyl alcohol as used in Comparative Example 4 was used as the organic binder. The resulting granules were shaped and fired to obtain a final product. The details of formulation and the results of evaluation are shown in Table 2.

TABLE 2

| | | Example 5 | Example 6 | Example 7 | Comparative Example 5 | Comparative Example 6 | Comparative Example 7 |
|---|---|---|---|---|---|---|---|
| Polyisobutylene (molecular weight) | | 40,000 | 60,000 | 2,500 | PVA | PVA | PVA |
| Mixing ratio* (by weight), (A)/(B) | | 50/50 | 70/30 | 60/40 | | | |
| Amount of binder added (parts by weight) | | 3.5 | 2.0 | 2.5 | 3.5 | 2.0 | 2.5 |
| Ceramic powder material | | Alumina | Tungsten carbide | Silicon nitride | Alumina | Tungsten carbide | Silicon nitride |
| Results of evaluation | Rate of granulation (% by weight) | — | 94.5 | 92.7 | — | 74 | — |
| | Green density (g/cc) | 2.36 | 7.15 | 1.80 | 2.22 | 6.61 | 1.68 |
| | Compression fracture strength (kg/cm$^2$) | 22.0 | 262 | 61.1 | 13.0 | 180 | 28.0 |
| | Surface condition** | ◎ | ◎ | ◎ | X | X | X |

*Ratio of (A) isobutylene polymer to (B) acrylic polymer.
**◎ = dense (no pores were observed);
X = porous (many pores were observed).

What is claimed is:

1. A method of making a dense fired ceramic article which comprises the steps of mixing a ceramic powder with an organic binder mixture of (A) 90 to 10% by weight of an isobutylene polymer of number average molecular weight of the order of 300 to 3,000 and (B) 10 to 90% of an acrylic polymer having a glass transition temperature in the range of −70 degrees C. to 190 degrees C. and being selected from the group consisting of arcylic homopolymers and acrylic copolymers and copolymers of acrylic monomers and vinyl monomers in an amount of 0.2 to 20 parts by weight per 100 parts by weight of the ceramic powder, granulating the resulting powder-binder mixture, forming a green body of the resulting granulated admixture, and firing the green body provide a dense fired product.

2. A method is claimed in claim 1 in which the amount of organic binder is about two parts by weight per 100 parts by weight of the ceramic powder.

3. A method is claimed in claim 1 in which the A and B mixture consists of 50% A by weight and 50% B by weight, and in which the molecular weight of isobutylene polymer is 750, and in which the amount of organic binder is about 2 parts by weight per 100 parts by weight of the ceramic powder.

4. A method as claimed in claim 1 in which the A and B mixture consists of 30% A and 70% B, both by weight, and in which the number average molecular weight of isobutylene polymer is 2500, and in which the amount of organic binder is about 2 parts per 100 parts, both by weight, of the ceramic powder.

* * * * *